United States Patent
Atherton et al.

(10) Patent No.: US 6,941,450 B2
(45) Date of Patent: Sep. 6, 2005

(54) SYSTEM AND METHOD FOR IDENTIFYING ONE OR MORE OPTIMUM CONFIGURATIONS OF A DATA PROCESSING SYSTEM

(75) Inventors: William Edward Atherton, Durham, NC (US); Gregory Joseph McKnight, Chapel Hill, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 09/918,330

(22) Filed: Jul. 30, 2001

(65) Prior Publication Data

US 2003/0023841 A1 Jan. 30, 2003

(51) Int. Cl.[7] ............................................. G06F 15/177
(52) U.S. Cl. ........................... 713/1; 710/104; 713/100
(58) Field of Search ............................... 713/1, 2, 100; 710/104

(56) References Cited

U.S. PATENT DOCUMENTS

| | | |
|---|---|---|
| 4,849,879 A | 7/1989 | Chinnaswamy et al. |
| 5,276,877 A | 1/1994 | Friedrich et al. |
| 5,619,701 A | 4/1997 | Neti |
| 5,884,075 A | 3/1999 | Hester et al. |
| 5,964,871 A | 10/1999 | Hester et al. |
| 5,991,826 A | 11/1999 | McGee et al. |
| 6,119,185 A | 9/2000 | Westerinen et al. |
| 6,125,408 A | 9/2000 | McGee et al. |
| 6,178,502 B1 | 1/2001 | Caswell et al. |
| 6,397,268 B1 * | 5/2002 | Cepulis ......................... 710/8 |
| 6,782,438 B1 * | 8/2004 | Duncan et al. ............. 710/104 |
| 2002/0138443 A1 * | 9/2002 | Schran et al. ................. 705/64 |

* cited by examiner

*Primary Examiner*—Dennis M. Butler
(74) *Attorney, Agent, or Firm*—Martin J. McKinley; Dillon & Yudell LLP

(57) ABSTRACT

A system and method for implementing a system optimizer utilized to determine if a current configuration of a data processing system is optimized for system performance according to testing criteria. If the current configuration is not optimized, alternate configurations are generated and analyzed to find at least one optimized alternate configuration. If an optimized alternate configuration is found, the system optimizer notifies a user. However, if at least one optimized alternate configuration is not found, the testing criteria is altered and the set of generated alternate configurations are analyzed utilizing the altered testing criteria.

24 Claims, 7 Drawing Sheets

| Bus | Slots Supported in 33MHz Conventional Mode | Slots Supported in 66MHz Conventional Mode | Slots Supported in 66MHz PCI-X Mode | Slots Supported in 100MHz PCI-X Mode | Slots Supported in 133MHz PCI-X Mode |
|---|---|---|---|---|---|
| 1 | 3 | 3 | 3 | 2 | 2 |
| 2 | 3 | 3 | 0 | 0 | 0 |
| 3 | 3 | 2 | 3 | 2 | 1 |

Fig. 4B

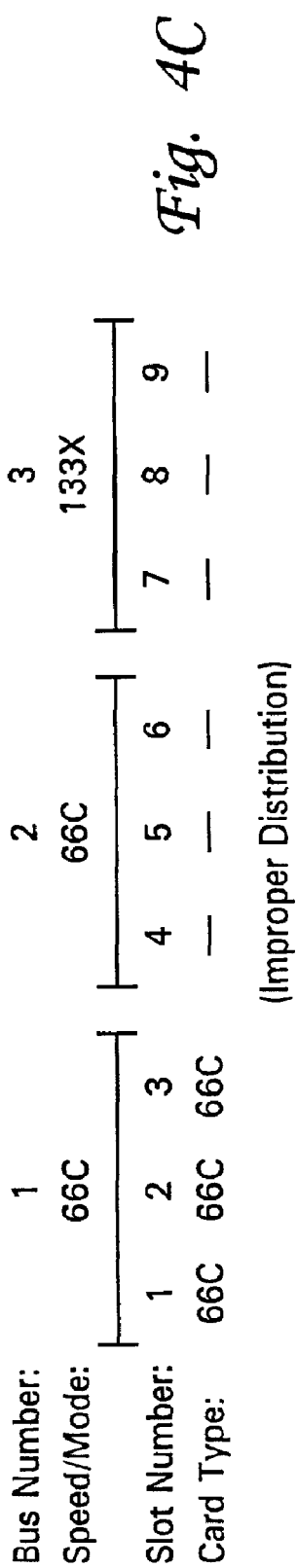
Fig. 4C (Improper Distribution)
Fig. 4D (Mixed Speeds)
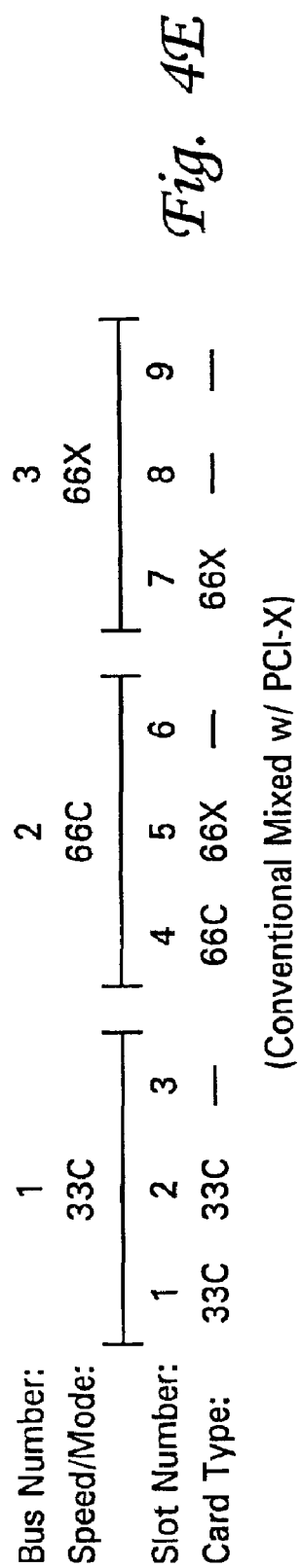
Fig. 4E (Conventional Mixed w/ PCI-X)

SYSTEM AND METHOD FOR IDENTIFYING ONE OR MORE OPTIMUM CONFIGURATIONS OF A DATA PROCESSING SYSTEM

BACKGROUND OF THE INVENTION

1. Technical Field

The present invention relates in general to data processing systems, and more particularly, to the configuration of data processing systems. Still more particularly, the present invention relates to a system and method for identifying optimum configurations within data processing systems.

2. Description of the Related Art

The peripheral component interconnect (PCI) specification introduced by Intel Corporation defines a high-performance local bus architecture that supports the installation of PCI-compliant expansion cards. The PCI standard has evolved over a period of years to support a wide assortment of system and hardware component capabilities. "Hardware components" are herein defined as any part of a data processing system and may include data storage devices, communication devices, etc. "Hardware adapters" are hardware components implemented on an adapter card installed on an expansion slot. Hardware adapters can usually be easily moved or replaced while other hardware components may be permanently coupled (soldered) to the data processing system.

Whereas the original PCI bus standard, herein referred to as "conventional mode," limits bus clock frequency either to 33 MHz or 66 MHz, newer PCI-X hardware adapters, operating in "PCI-X mode," are capable of bus communication at 66 MHz or 133 MHz. Available PCI-compatible hardware adapters support either 32-bit wide and 64-bit wide versions of the PCI bus and operate at a variety of supply voltages (e.g., 3.3 V and 5V). Future expansions and revisions of the PCI architecture may include higher supported clock speeds, wider buses, or double-data rate modes of operation, which will result in an even wider array of possible system configurations.

Despite the wide array of implementations, compatibility has been maintained between devices implementing different versions of the PCI bus specification. For example, PCI buses are programmed to operate at the fastest common speed or mode that all hardware components on the bus can support. Hardware components restrict their speed or mode in the presence of buses or hardware components that are not capable of faster operation. In general, hardware components having different characteristics that are coupled to the same PCI bus will function properly, but the performance of the faster hardware components will be degraded due to the lower bus frequency dictated by the slower hardware components. "System performance" or "performance" is herein defined as the throughput of a data processing system or the total number of users the data processing system can currently support.

The performance of hardware devices on the PCI buses within the system is a key factor in the overall performance of the system. Accordingly, the present invention recognizes that configurations that prevent devices from operating at their maximum capability should be avoided. For example, careless placement of a hardware adapter (e.g., mismatching speeds by placing a 33 MHz hardware adapter on a 133 MHz bus or mixing modes by placing a conventional mode hardware adapter on a PCI-X mode bus) may result in significant performance degradation. A data processing system continues to function despite the less-than-optimum hardware component configuration, so problems with the configuration may only be evident during special circumstances (e.g., intervals of peak demand of the data processing system resources).

Consequently, since system administrators and other computer users are typically not experts on PCI bus specifications, there is a growing demand for a system and method for identifying less-than-optimum configurations and recommending alternate configurations better optimized for system performance.

SUMMARY OF THE INVENTION

To overcome the foregoing and additional limitations of the prior art, the present invention provides an improved system and method of identifying one or more optimum configurations of a data processing system. The data processing system utilized to implement a preferred embodiment of the present invention includes a system optimizer stored in a memory and executable by a processor.

In operation, the system optimizer determines if a current configuration of a data processing system is optimized for system performance according to testing criteria. If the current configuration is not optimized, the system optimizer generates and analyzes alternate configurations to find at least one optimized alternate configuration. If at least one optimized alternate configuration is found, the system optimizer notifies a user. However, if at least one optimized alternate configuration is not found, the testing criteria are altered and the generated set of alternate configurations are analyzed utilizing the altered testing criteria.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4B is a chart illustrating a set of rules for interconnects in a sample data processing system according to preferred embodiment of the present invention;

FIG. 4C depicts an original configuration of a data processing system where the hardware adapters are improperly distributed across the interconnects;

FIG. 4D illustrates an original configuration of a data processing system where hardware adapters of mixed speeds occupy the same interconnect;

FIG. 4E depicts an original configuration of a data processing system where hardware adapters of mixed modes occupy the same interconnect;

DETAILED DESCRIPTION OF THE PREFERRED EMBODIMENT

Figure 1:
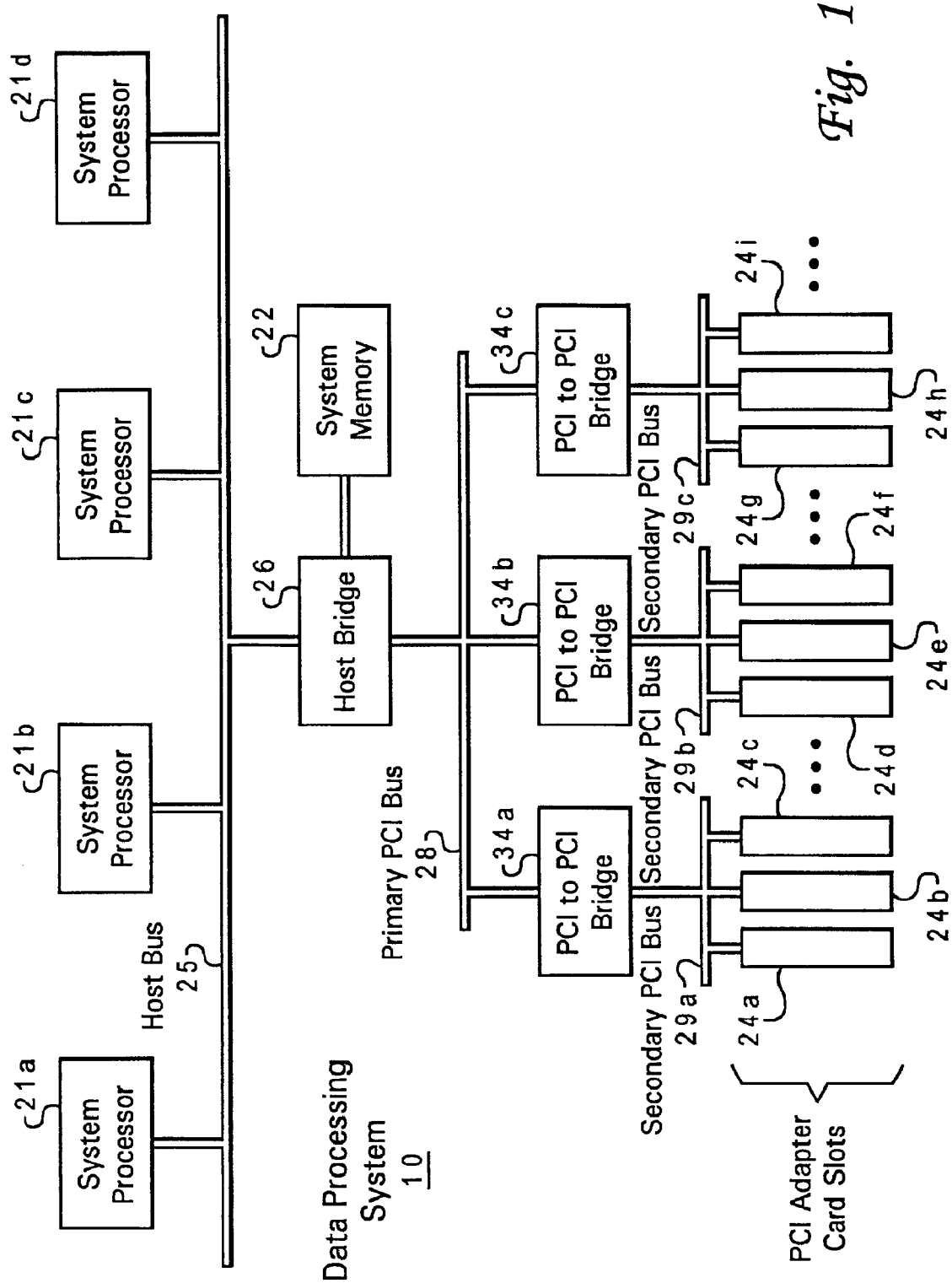
FIG. 1 depicts a block diagram of an exemplary data processing system, which may be utilized to implement the present invention.

With reference now to the figures, and in particular, with reference to FIG. 1, there is depicted a block diagram of an exemplary data processing system 10 in which a preferred embodiment of the present invention may be implemented. As illustrated, data processing system 10 includes one or more system processor(s) 21a–21d and input/output (I/O) host bridge 26, herein referred to as "host bridge 26," coupled by a first interconnect (host bus) 25. System processor(s) 21a–21d, implemented as any generation of Pentium™ processor available from Intel Corporation in Santa Clara, Calif., are coupled to host bus 25 and execute software instructions to control the operation of data processing system 10. Host bridge 26 couples system memory 22 and a primary peripheral component interconnect (PCI) bus 28 to both host bus 25 and system processor(s) 21a–21d. System memory 22, coupled to host bridge 26 and provides storage for software and data, may include both read-only memory (ROM) and random access memory (RAM).

Coupling secondary PCI buses 29a–29c to primary PCI bus 28 are PCI-to-PCI bridges 34a–34c. Each of secondary PCI buses 29a–29c and primary PCI bus 28 (sometimes referred to as "bus segments") are electrically isolated from each other by host bridge 26 and PCI-to-PCI bridges 34a–34c. PCI hardware adapter slots 24a–24i are electrical connectors for coupling PCI hardware adapters to data processing system 10. Once inserted and powered, PCI hardware adapters became an integral part of data processing system 10 and are controllable by system processor(s) 21a–21d by relaying PCI bus transactions along the path formed by PCI hardware adapter slots 24a–24i, PCI-to-PCI bridges 34a–34c, primary PCI bus 28, host bridge 26, and host bus 25. Some system configurations do not utilize PCI-to-PCI bridges 34a–34c, and configure PCI hardware adapter slots 24a–24i on primary PCI bus 28. Other system configurations may employ more than three PCI hardware adapter slots on each secondary PCI bus.

Other elements of a data processing system, such as direct access storage devices (DASD), network I/O controllers, video controllers, and others may be implemented as different PCI hardware adapters coupled to PCI hardware adapter slots 24a–24i. Other elements may be implemented as hardware components soldered to a main system circuit board.

Figure 2:
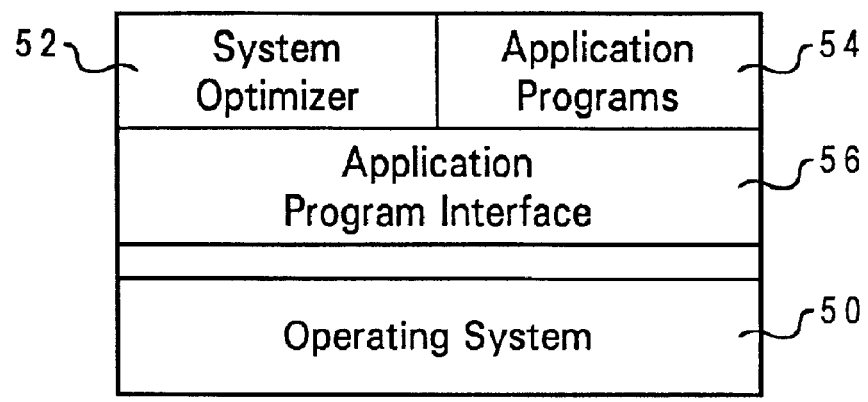
FIG. 2 illustrates a layer diagram of the software, including a system optimizer, utilized to implement a preferred embodiment of the present invention.

Referring now to FIG. 2, a software layer diagram of the software configuration of data processing system 10 is illustrated. As well-known in the art, a data processing system requires a set of program instructions, known as an operating system, to function properly. Basic functions (e.g., saving data to a memory device or controlling the input and output of data by the user) are handled by operating system 50, which may be at least partially stored in system memory 22 of data processing system 10. Application programs 54 for user functions (e.g., e-mail programs, word processors, Internet browsers), runs on top of operating system 50. System optimizer 52, stored within system memory 22 and executable by system processor(s) 21a–21d, analyzes the current configuration of data processing system 10 and determines whether or not the current configuration is an optimized configuration. If the current configuration is not optimized, system optimizer 52 generates and presents to a user at least one alternate optimized configuration.

As shown, system optimizer 52 and application programs 54 access the functionality of operating system 50 via an application program interface 56 in one preferred embodiment of the present invention. In an alternative embodiment of the present invention, system optimizer 52 may also be implemented as part of operating system 50.

Figure 3B:
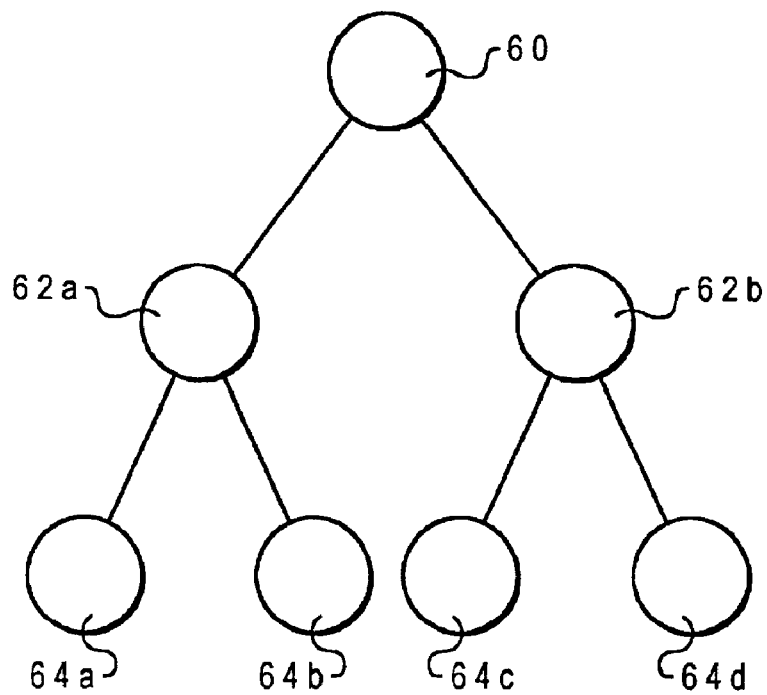
FIG. 3B illustrates an exemplary tree structure utilized for storing a set of alternate configurations generated by the system optimizer according to a preferred embodiment of the present invention.
Figure 3A:
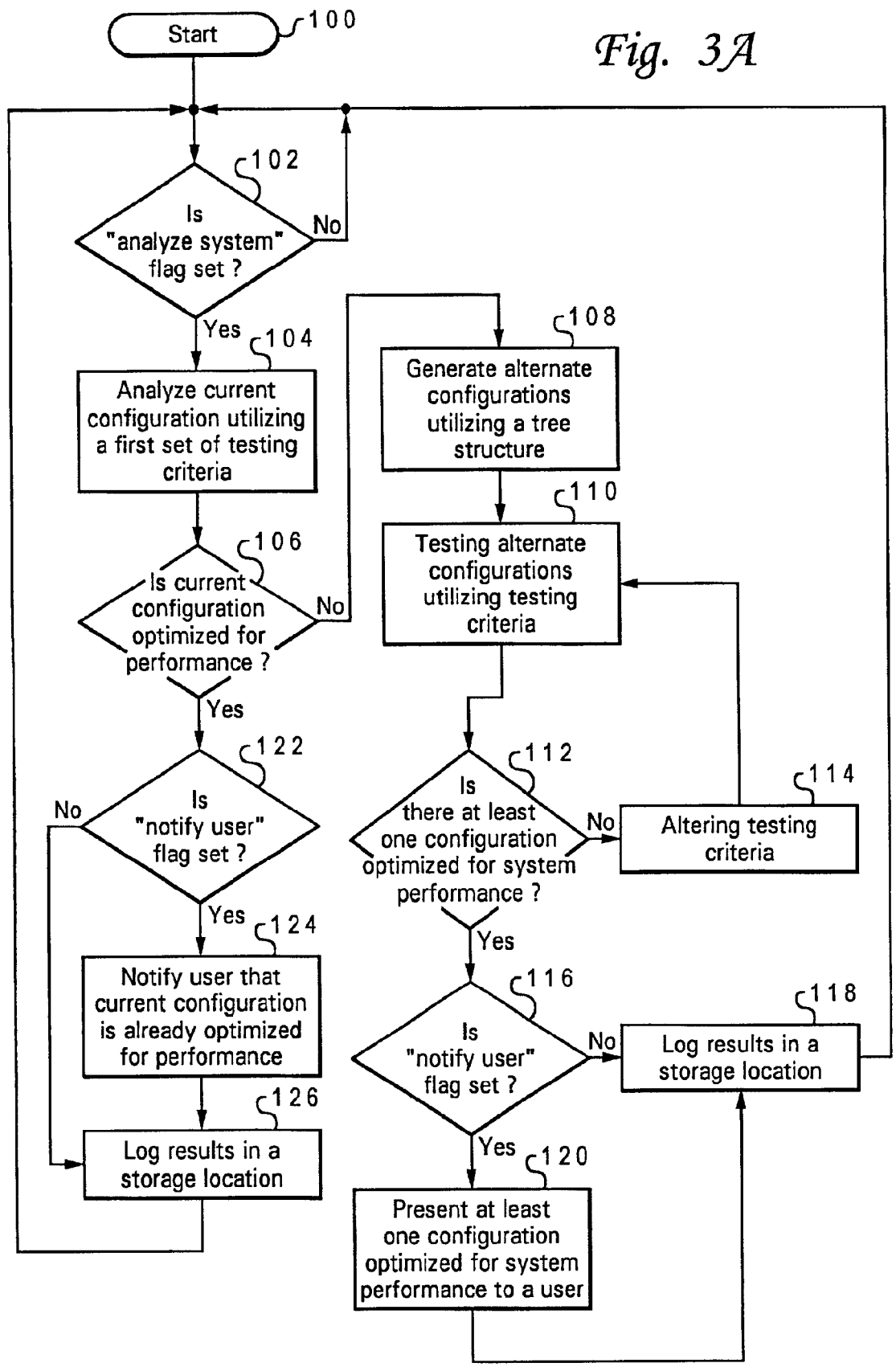
FIG. 3A is a high-level logic flowchart depicting a method for identifying one or more optimum configurations of a data processing system according to a preferred embodiment of the present invention.

With reference to FIG. 3A, there is depicted a high-level logic flowchart illustrating a method of identifying one or more optimum configurations of a data processing system according to a preferred embodiment of the present invention. Although the method referred to by FIG. 3A optimizes the configuration of PCI adapters on a PCI interconnect, the method may apply to any hardware configuration of any hardware interconnect. The method of identifying optimum configurations can be implemented utilizing a system optimizer 52 stored in memory 22 and executable by system processor(s) 21a–21d of data processing system 10.

In the method depicted in FIG. 3A, a first set of testing criteria is utilized to test the current configuration of data processing system 10, which criteria may include: determining if (1) any interconnect is operating at a speed or mode slower than the maximum capability of any hardware adapter coupled to the interconnect, (2) all hardware adapters coupled to an interconnect are capable of the same speed of operation, (3) all hardware adapters coupled to an interconnect are capable of the same mode of operation, (4) any interconnect can not support the required number of interconnect loads at speed and mode of coupled hardware adapters, (5) any interconnect couples hardware adapters that are not supported by the interconnect, (6) the hardware adapters are improperly distributed over the interconnects, (7) a configuration already appears on the tree structure, (8) a configuration results from moving a hardware adapter to an interconnect that cannot support hardware adapters of that type, (9) a configuration results from swapping one hardware adapter with a hardware adapter of the same type, (10) a configuration results from moving a hardware adapter to a slot on the interconnect when a lower numbered slot in the same interconnect is empty, and (11) the configuration is considered optimum according to any other testing criteria, which may be provided by the user. In a preferred embodiment of the present invention, a tree structure is utilized to describe other possible configurations of the hardware adapters and interconnects. This first set of testing criteria is thus also utilized to reduce the size of the tree structure to a manageable level and to eliminate redundant configurations.

Care must be taken, however, to not overly restrict the growth of the tree structure. Some configurations may be intermediate steps required to reach a desired optimized system configuration. Examples of acceptable intermediate configurations may result from: (1) moving a hardware adapter to another position on the interconnect, (2) overloading an interconnect, or (3) mixing hardware adapters that operate at different speeds and modes on the same interconnect.

In one preferred embodiment of the present invention, the operation speed of the interconnect or hardware component is measured in megahertz and the operation mode is either a conventional or PCI-X mode. The operational speed and mode of interconnects in data processing system 10 are evaluated so that the interconnects are permitted to operate at the fastest speed and mode supported by the coupled hardware adapters, thus avoiding the significant performance degradation which may result from an interconnect operating at lower that the maximum rated speed and/or mode.

Also, hardware adapters in data processing system 10 may be considered improperly distributed if one interconnect is heavily populated with multiple coupled hardware adapters, and there exists an unpopulated interconnect capable of the same operation speed and mode as the heavily populated bus. This results in a reduced throughput from the heavily populated interconnect, while a comparable interconnect is not utilized in the data processing system 10. A method for determining whether or not hardware adapters are improperly distributed over interconnects, herein referred to as an "optimal distribution determination," is described below in more detail.

As illustrated, the process of FIG. 3A begins at block 100, and continues to block 102, which depicts system optimizer 52 determining whether or not the "analyze system" flag is set. The "analyze system" flag indicates whether the user requires system optimizer 52 to analyze the current configuration of the data processing system. Often, the user may only require system optimizer 52 to analyze the data processing system configuration during system initialization or after a modification to the hardware configuration (e.g., if a hardware adapter is added, removed, or swapped) is made. If the "analyze system" flag is not set, the process loops back to block 102 and, after a predetermined time latency, and tests the "analyze system" flag again. If the "analyze system" flag is set, as shown in block 104, system optimizer 52 analyzes a current configuration of data processing system 10 utilizing the first set of testing criteria.

Next, the process continues to block 106 and enters an alternate configuration generation and analysis loop including blocks 108, 110, 112, 114, 116, 118, and 120. In one preferred embodiment, system optimizer 52 generates a set of alternate configurations for data processing system 10 organized in a tree structure, analyzes the set of alternate configurations utilizing a first set of testing criteria, and presents at least one optimized configuration to a user.

As depicted in block 108, if system optimizer 52 determines the current configuration of the data processing system is not optimized for system performance, system optimizer 52 generates alternate configurations of the current configuration and stores them in a tree structure. Referring to FIG. 3B, there is depicted an exemplary tree structure. Root node 60 represents a current configuration of the data processing system. Child nodes 62a–62b represent alternate configurations generated by system optimizer 52 by performing one alteration to the current configuration. For example, when configuring hardware adapters coupled to a set of bus slots, examples of alterations include: (1) moving a hardware adapter from one slot to another or (2) swapping the positions of two hardware adapters. Also, child nodes 64a–64b represent alternate configurations of child node 62a and child nodes 64c–64d represent alternate configurations of child node 62b. Returning to FIG. 3A, system optimizer 52 tests each alternate configuration with the first set of testing criteria to determine at least one alternate configuration optimized for system performance, as shown in block 110.

Following block 110, the analysis of the generated alternate configurations continues at block 112, which depicts a determination of whether or not there is at least one configuration optimized for system performance. If so, system optimizer 52 determines if a "notify user" flag is set, as illustrated at block 116. Often, the user might not want to be interrupted by system optimizer 52 indicating the results of routine system optimizer tests (e.g., test performed at system initialization). The user has an option of logging the results of the tests in a storage location (e.g., in memory 22) and viewing the results at a later date, as depicted at block 118. The process then loops back from block 118 to block 102. However, if an unscheduled system optimizer test is performed by the request of the user, the "notify user" flag is automatically set and the user is notified of the results of the tests. If the "notify user" flag is set, at least one configuration more optimized for system performance is presented to the user, as depicted in block 120. The process passes to block 118, where system optimizer 52 stores at least a configuration more optimized for system performance in a storage location for further reference by the user. The process returns from block 118 to block 102.

Returning to block 112, if the set of alternate configurations do not include a configuration optimized for system performance, the process passes to block 114, where the criteria utilized for testing is altered by system optimizer 52. System optimizer 52 alters the first set of testing criteria by adding or subtracting rules. The rules to be added or subtracted may be determined as preset settings or by settings modified by the user. For example, the optimal distribution determination (discussed in FIG. 4A) may be determined by system optimizer 52 to not be an important factor for an optimum configuration. System optimizer 52 can eliminate this rule from the first set of testing criteria, thus generating an altered (second) set of testing criteria. Acceptable configurations found utilizing the second set of testing criteria do not meet all of the requirements of the first set of testing criteria, but will possibly result in better system performance than the current configuration. Then, the process returns from block 114 to block 110, where the process analyzes the generated alternate configurations utilizing the second set of testing criteria, as illustrated.

Referring again to block 106, if the current configuration is already optimized for performance, system optimizer 52 checks if the "notify user" flag is set, as illustrated at block 122. System optimizer 52 notifies the user that the current configuration is already optimized for performance if the "notify user" flag is set, as shown in block 124, and logs the result of the test of the current configuration in a storage location, as shown in block 126. If the "notify user" flag is not set, system optimizer 52 stores results of the test of the current configuration in a storage location, as shown in block 126. Then, the process returns to block 102 from block 126.

By testing the current hardware configuration of a data processing system, the user determines whether or not the system is operating at an optimum level. System optimizer 52 analyzes the current configuration and suggests alternative configurations when necessary.

Figure 4A:
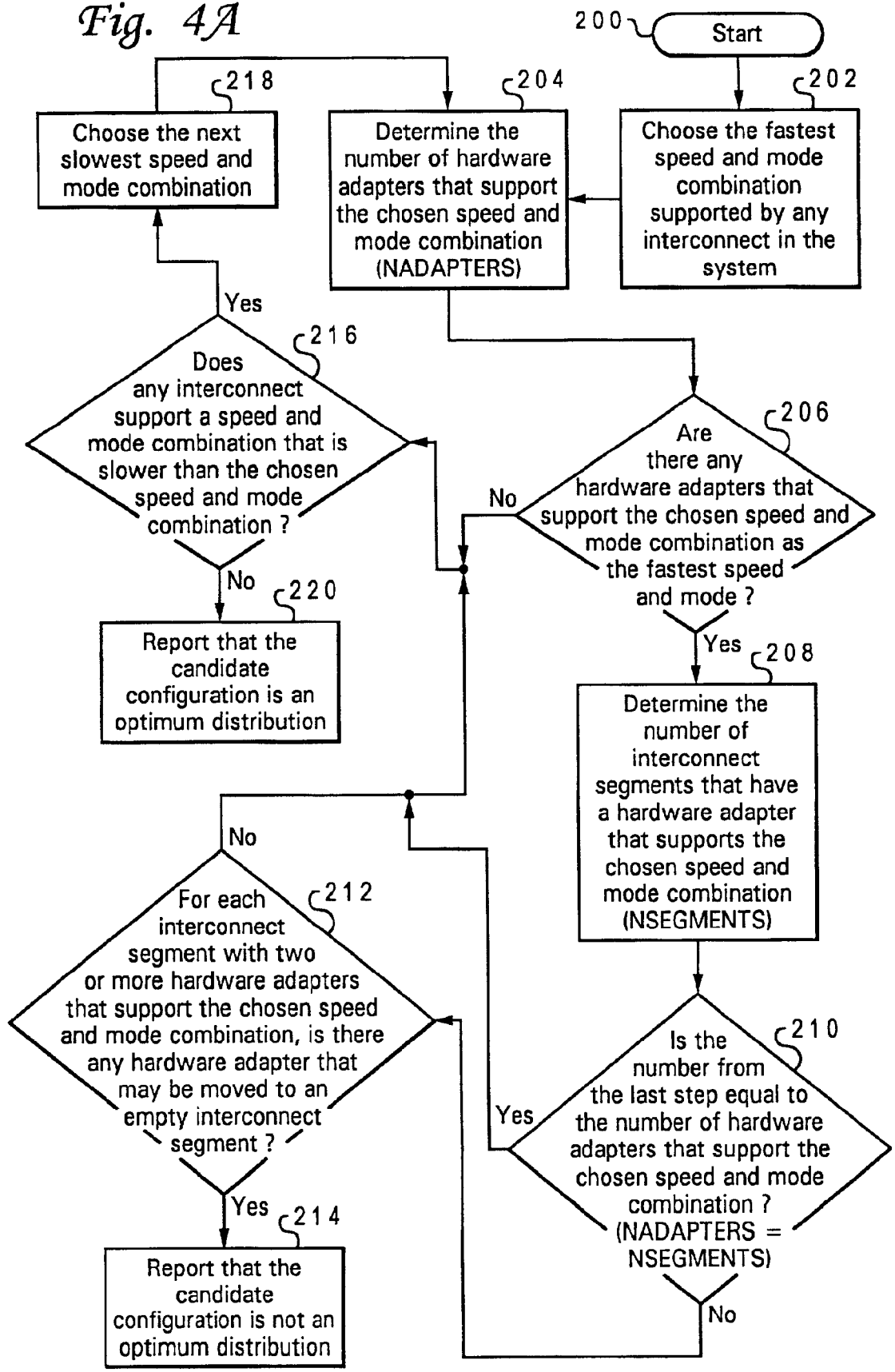
FIG. 4A is a high-level logic flowchart depicting a method for an optimal distribution determination according to a preferred embodiment of the present invention.

Referring now to FIG. 4A, there is illustrated a high-level logic flowchart depicting a method for implementing an optimum distribution determination according to a preferred embodiment of the present invention. The method of identifying optimum distributions can be implemented utilizing a system optimizer 52 stored in memory 22 and executable by system processor(s) 21a–21d of data processing system 10, wherein system optimizer 52 analyzes alternate configurations generated, as depicted in block 110 of FIG. 3A to determine if each alternate configuration optimally distributes hardware adapters across the interconnect.

At blocks 200–204, system optimizer 52 analyzes data processing system 10 to determine a set of preliminary information required to implement the method of determining an optimal distribution. In particular, block 202 depicts system optimizer 52 designating the fastest available speed and mode combination as the "chosen speed and mode combination" supported by the interconnect segments in data processing system 10. Then, as depicted in block 204, system optimizer 52 determines the number of hardware adapters that are capable of operating at the chosen fastest speed and mode combination (NADAPTERS).

The process next enters a loop including blocks 206, 208, 210, and 212, which illustrates a determination of an ideal distribution of hardware adapters on the interconnect segments. If there are hardware adapters that support the chosen speed and mode combination, as illustrated in block 206, system optimizer 52 determines the number of interconnect segments that have a hardware adapter that supports the chosen speed and mode combination, as depicted in block 208. As illustrated at block 210, system optimizer 52 determines whether or not the number of interconnect segments that have a hardware adapter (NSEGMENTS) that support the chosen speed and mode combination is equal to the number of hardware adapters that support the chosen speed and mode combination (NADAPTERS).

If NSEGMENTS equals NADAPTERS, system optimizer 52 determines whether or not there are any speed and mode combinations slower than the chosen speed and mode combination, as depicted in block 216. If there are slower combinations, system optimizer 52 chooses the next fastest available speed and mode combination, as illustrated in block 218. The process then returns to block 204 from block 218. If there are not more slower combinations, system optimizer 52 reports that the tested configuration is an optimal distribution, a depicted at block 220, and the process ends.

If NSEGMENTS does not equal NADAPTERS, system optimizer 52 determines for each interconnect segment with two or more hardware adapters that support the chosen speed and mode combination if there are any hardware adapters capable of operating only as fast as the chosen speed and mode that may be moved to an empty interconnect segment, as depicted in block 212. If any hardware element can be moved, system optimizer 52 reports the tested configuration is not an optimal distribution, as illustrated at block 214, and the process ends. However, if none of the hardware adapters can be moved, the process loops to block 216 from block 212.

In a preferred embodiment of the present invention, the method of identifying one or more optimum configurations in a data processing system may be utilized for determining an optimum configurations of adapter cards on PCI interconnect segments.

With reference to FIG. 4B, there is depicted a chart detailing a set of possible rules required for configuring a sample data processing system. The rules in the chart in FIG. 4B are a partial set that determines whether or not the buses are electrically overloaded if they run at the maximum speed that supports the current bus population of hardware adapters. In the sample data processing system, there are three buses with slots one to three on the first bus, slots four to six on the second bus, and slots seven to nine on the third bus. The layout of the slots and the limitations of each bus indicated in the chart were chosen arbitrarily to illustrate various aspects of a preferred embodiment of the present invention and do not necessarily match the configuration of any known system.

With reference to FIGS. 4C–4G, there are illustrated exemplary data processing system configurations that can be optimized in accordance with the method of identifying one or more optimum configurations of a data processing system outlined in FIG. 3A. The data processing system employed in each example has three buses, with three segments (slots) on each bus. The number of each symbol in FIGS. 4C–4G represents the maximum operational speed of the hardware adapter. The 'X' denotes hardware adapter capable of PCI-X mode operation, while a 'C' indicates the hardware adapter operates solely in the PCI conventional mode. For example, with reference to FIG. 4C, bus 1 couples three 66C hardware adapters, or hardware adapters with the maximum performance of 66 MHz, conventional mode operation.

In FIG. 4C, system optimizer 52 determines that the current configuration is not optimum due to the improper distribution of the adapter cards. Specifically, bus 1 is fully loaded with 66 MHz conventional mode adapters while buses 2 and 3 are unoccupied. System optimizer 52 may suggest that the user move the hardware adapter in slot 1 to slot 4, move the hardware adapter in slot 2 to slot 7, and reset the buses to select an optimum speed and mode (e.g., resetting bus 3 to a 66 MHz speed and conventional mode). These adjustments redistribute the loads across all available buses to optimize performance. Although system optimizer 52 can determine more than one optimum configuration, the alternate configuration presented to the user is preferably the configuration that requires the least change of hardware configuration. The user, however, can disable this feature and require system optimizer 52 to present all alternate configurations. This example illustrates that the methods presented in the present invention are capable of identifying alternate configurations when the distribution of adapter cards across all available buses may help optimize performance.

Referring now to FIG. 4D, there is depicted a data processing system configuration that is less than optimum due to the use of a lower speed adapter with higher speed adapters on the same bus. According to the method of FIG. 3A, system optimizer 52 recommends to the user to move the hardware adapter in slot 3 to slot 8 and reset the buses to operate at the optimum speed and mode setting. The hardware adapter in slot 3 in the original configuration cannot be moved to a slot on bus 2 because according to FIG. 4B, bus 2 does not support a 66 MHz PCI-X mode adapter card.

With reference to FIG. 4E, there is illustrated another data processing system configuration that is not considered optimum due to the combination of conventional and PCI-X mode adapters on the same bus segment. The hardware adapter in slot 5 should be moved to slot 8, according to the recommendation of system optimizer 52.

Figure 4F:
FIG. 4F illustrates an original configuration of a data processing system where the interconnects are fully occupied with hardware adapters.

Referring now to FIG. 4F, there is depicted a data processing system in which all bus segment slots are filled. System optimizer 52 recommends a three step procedure modifying the hardware adapters by swapping hardware adapters (1) in slots 4 and 7, (2) in slots 3 and 6, and (3) in slots 3 and 9 implement an more optimum configuration. This example demonstrates that methods outlined in the present invention can identify and recommend alternate configurations even when adapter cards in the current configuration occupies all the slots on the bus segments.

Figure 4G:
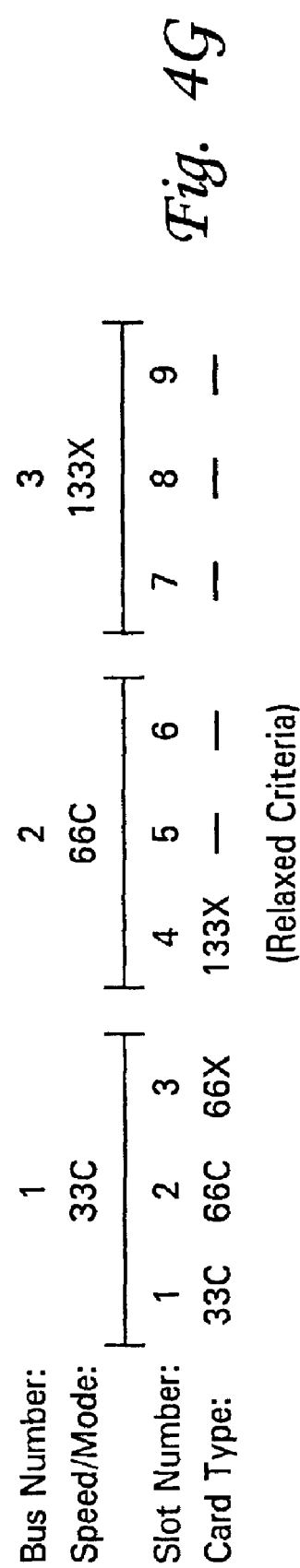
FIG. 4G depicts an original configuration of a data processing system for which alternate configurations are generated by the system optimizer utilizing a relaxed (or second) set of testing criteria.

With reference to FIG. 4G, there is depicted a data processing system configuration for which an acceptable alternate configuration cannot be found utilizing the first set of testing criteria. During the first test of the current configuration, system optimizer 52 is unable to recommend an optimum configuration because there are four different types of adapters and only three buses. However, by recognizing this situation and relaxing the first set of testing criteria (by allowing mixed mode configurations) during a second search, system optimizer 52 is able to suggest moving the 66 MHz adapters onto the same bus and to allow all adapters to operate at the maximum speed by (1) moving the hardware adapter in slot 4 to slot 7 and (2) moving the hardware adapter in the slot 1 to slot 4. Unfortunately, the PCI-X mode on one of the 66 MHz adapters had to be sacrificed to achieve a more optimum configuration.

As described above, an improved system and method of identifying one or more optimum configurations of a data processing system is presented. In accordance with a preferred embodiment of the present invention, the data processing system includes a system optimizer stored in a memory and executable by a processor.

The system optimizer determines if a current configuration of a data processing system is optimized for system performance according to testing criteria. If the current configuration is not optimized, alternate configurations are generated and analyzed to find at least one optimized alternate configuration. If at least one optimized alternate configuration is found, the system optimizer notifies a user. However, if at least one optimized alternate configuration is not found, the testing criteria is altered and another set of alternate configurations are generated and analyzed.

While the invention has been particularly shown and described with reference to a preferred embodiment, it will be understood by those skilled in the art that various changes in form and detail may be made therein without departing from the spirit and scope of the invention. For example, the present invention may apply to other hardware optimization methods and systems other than ones that utilize the PCI technology.

What is claimed is:

1. A method for identifying one or more optimum configurations of a data processing system, said method comprising:

determining if an operable current configuration of a plurality of hardware adapters and an interconnect of said data processing system is optimized for system performance utilizing testing criteria, wherein said determining includes determining if said operable current configuration maximizes data transfer rate between said plurality of hardware adapters and said interconnect;

in response to determining said current operable configuration is not optimized, generating alternate configurations of said plurality of hardware adapters and said interconnect;

analyzing said alternate configurations utilizing said testing criteria to identify at least one configuration optimized for system performance;

in response to identifying at least one configuration optimized for system performance, presenting said at least one configuration optimized for system performance to a user; and in response to not identifying a configuration optimized for system performance, altering said testing criteria and again analyzing said alternate configurations.

2. The method according to claim 1, wherein said determining further includes:

determining if said operable current configuration of said plurality of hardware adapters and said interconnect is optimized for system performance utilizing testing criteria, wherein said operable current configuration is a collection of physical connections to said interconnect.

3. The method according to claim 1, said generating further includes:

constructing a tree structure in which said current configuration is a root node and said alternate configurations are child nodes of said root node.

4. The method according to claim 3, wherein said testing criteria comprises first testing criteria, said method further comprising:

rejecting an alternate configuration if said alternate configuration does not meets said first testing criteria.

5. The method according to claim 4, wherein said rejecting further comprises:

testing said alternate configuration for improper placement of at least a plurality of hardware adapters on a plurality of interconnect segments.

6. The method according to claim 5, wherein said testing further includes:

for a candidate configuration, designating a fastest setting supported by said interconnect as a chosen setting;

determining whether or not a number of a plurality of hardware adapters that support said chosen setting (NADAPTERS) equals a number of a plurality of interconnect segments coupled to at least a hardware adapter that supports said chosen setting (NSEGMENTS);

in response to determining NADAPTERS does not equal NSEGMENTS, determining whether or not at least one of said plurality of hardware adapters can be moved to an empty one of said plurality of interconnect segments; and in response to determining at least one of said plurality of hardware adapters can be moved to an empty one of said plurality of interconnect segments, determining said candidate configuration is not an optimal configuration.

7. The method according to claim 6, wherein said testing further comprises:

in response to determining NADAPTERS equals NSEGMENTS, determining whether or not there is at least a slower setting than said chosen setting;

in response to determining there is at least a slower setting, designating said slower setting as said chosen setting;

in response to determining there is not at least a slower setting, determining said candidate configuration is said optimal configuration.

8. The method according to claim 3, said constructing further includes:

constructing said tree structure such that said alternate configurations are variations of said current configuration obtained by performing one alteration to said current configuration.

9. A system for identifying one or more optimum configurations of a data processing system, said system comprising:

an interconnect;

a processor, coupled to said interconnect;

a memory coupled to said processor; and a system resource optimizer resident in said memory and executable by said processor to determine if an operable current configuration of a plurality of hardware adapters and said interconnect of said data processing system is optimized for system performance utilizing testing criteria, wherein said system resource optimizer determines if said operable current configuration maximizes data transfer rate between said plurality of hardware adapters and said interconnect, wherein responsive to a determination that said operable current configuration is not optimized, said system optimizer generates alternate configurations of said plurality of hardware adapters and said interconnect and analyzes said alternate configurations with said testing criteria to identify at least one configuration optimized for system performance that is presented to a user, and wherein responsive to failing to identify at least one configuration optimized for system performance, said system optimizer alters said testing criteria and again analyzes said alternate configurations.

10. The system according to claim 9, wherein said operable current configuration further comprises:
a collection of physical connections to said interconnect.

11. The system according to claim 9, said system optimizer further comprising:
means for constructing a tree structure in which said current configuration is a root node and said alternate configurations are child nodes of said root node.

12. The system according to claim 11, wherein said testing criteria comprises first testing criteria, said system further comprising:
means for rejecting an alternate configuration if said alternate configuration does not meet said first testing criteria.

13. The system according to claim 12, wherein said means for rejecting further comprises:
means for testing said alternate configuration for improper placement of at least a plurality of hardware adapters on a plurality of interconnect segments.

14. The system according to claim 13, wherein said means for testing further includes:
for a candidate configuration, means for designating a fastest setting supported by said interconnect as a chosen setting;
means for determining whether or not a number of a plurality of hardware adapters that support said chosen setting (NADAPTERS) equals a number of a plurality of interconnect segments coupled to at least a hardware adapter that supports said chosen setting (NSEGMENTS);
means, responsive to determining NADAPTERS does not equal NSEGMENTS, for determining whether or not at least one of said plurality of hardware adapters can be moved to an empty one of said plurality of interconnect segments; and means, responsive to determining at least one of said plurality of hardware adapters can be moved to an empty one of said plurality of interconnect segments, for determining said candidate configuration is not an optimal configuration.

15. The system according to claim 14, wherein said means for testing further comprises:
means for determining whether or not there is at least a slower setting than said chosen setting, if NADAPTERS equals NSEGMENTS;
means, responsive to determining there is at least a slower setting for designating said slower setting as said chosen setting;
means, responsive to determining there is not at least a slower setting, for determining said candidate configuration is said optimal configuration.

16. The system according to claim 11, said means for constructing further comprising:
means for constructing said tree structure such that said alternate configurations are variations of said current configuration obtained by performing one alteration to said current configuration.

17. A computer program product comprising:
a computer-usable medium; and
a system resource optimizer encoded within said computer-usable medium to determine if an operable current configuration of a plurality of hardware adapters and an interconnect of a data processing system is optimized for system performance utilizing testing criteria, wherein said system resource optimizer determines if said operable current configuration maximizes data transfer rate between said plurality of hardware adapters and said interconnect, wherein responsive to a determination that said operable current configuration is not optimized, said system optimizer generates alternate configurations of said plurality of hardware adapters and an interconnect and analyzes said alternate configurations with said testing criteria to identify at least one configuration optimized for system performance that is presented to a user; and wherein responsive to failing to identify at least one configuration optimized for system performance, said system optimizer alters said testing criteria and again analyzes said alternate configurations.

18. The computer program product according to claim 17, wherein said operable current configuration further computes:
a collection of physical connections to said interconnect.

19. The computer program product according to claim 17, said instructions for generating further includes:
instructions, encoded within said computer-usable medium, for constructing a tree structure in which said current configuration is a root node and said alternate configurations are child nodes of said root node.

20. The computer program product according to claim 19, wherein said testing criteria comprises first testing criteria, said computer program product further comprises:
instructions, encoded within said computer-usable medium, for rejecting an alternate configuration if said alternate configuration does not meet said first testing criteria.

21. The computer program product according to claim 20, wherein said instructions for rejecting further comprises:
instructions, encoded within said computer-usable medium, for testing said alternate configuration for improper placement of at least a plurality of hardware adapters on a plurality of interconnect segments.

22. The computer program product according to claim 21, wherein said instructions for testing further includes:
for a candidate configuration, instructions, encoded within said computer-usable medium, for designating a fastest setting supported by said interconnect as a chosen setting;
instructions, encoded within said computer-usable medium, for determining whether or not a number of a plurality of hardware adapters that support said chosen setting (NADAPTERS) equals a number of a plurality of interconnect segments coupled to at least a hardware adapter that supports said chosen setting (NSEGMENTS);
in response to determining NADAPTERS does not equal NSEGMENTS, instructions, encoded within said computer-unable medium, for determining whether or not at least one of said plurality of hardware adapters can be moved to an empty one of said plurality of interconnect segments; and in response to determining at least one of said plurality of hardware adapters can be moved to an empty one of said plurality of interconnect segments, instructions, encoded within said computer-usable medium, for determining said candidate configuration is not an optimal configuration.

23. The computer program product according to claim 22, wherein said instructions for testing further comprises:

in response to determining NADAPTERS equals NSEGMENTS, instructions, encoded within said computer-usable medium, for determining whether or not there is at least a slower setting than said chosen setting;

in response to determining there is at least a slower setting, instructions, encoded within said computer-usable medium, for designating said slower setting as said chosen setting;

in response to determining there is not at least a slower setting, instructions, encoded within said computer-usable medium, for determining said candidate configuration is said optimal configuration.

24. The computer program product according to claim 19, said constructing further includes:

instructions, encoded within said computer-usable medium, for constructing said tree structure such that said alternate configurations are variations of said current configuration obtained by performing one alteration to said current configuration.

* * * * *